(12) United States Patent
Futatsugi et al.

(10) Patent No.: US 6,259,431 B1
(45) Date of Patent: *Jul. 10, 2001

(54) IMAGE PROCESSOR, GAME MACHINE, IMAGE DISPLAY METHOD, AND RECORDING MEDIUM

(75) Inventors: Yukio Futatsugi; Shiro Maekawa; Yojiro Ogawa; Tatsuo Yamajiri, all of Tokyo (JP)

(73) Assignee: Kabushiki Kaisha Sega Enterprises, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,771
(22) PCT Filed: Jul. 4, 1997
(86) PCT No.: PCT/JP97/02331
§ 371 Date: Mar. 3, 1998
§ 102(e) Date: Mar. 3, 1998
(87) PCT Pub. No.: WO98/01824
PCT Pub. Date: Jan. 15, 1998

(30) Foreign Application Priority Data

Jul. 4, 1996 (JP) .................................................. 8-174769

(51) Int. Cl.[7] ............................................ G09G 5/08
(52) U.S. Cl. ................................. 345/157; 463/31
(58) Field of Search ...................... 345/457, 156, 345/139, 145; 463/30, 31, 32, 33; 273/148 B

(56) References Cited

U.S. PATENT DOCUMENTS 5,616,079 * 4/1997 Iwase et al. ............................. 463/32
5,704,837 * 1/1998 Iwasaki et al. ......................... 463/38

FOREIGN PATENT DOCUMENTS 6-162170   6/1994 (JP) .
7-8632  * 1/1995 (JP) .
8-131653   5/1996 (JP) .

* cited by examiner

Primary Examiner—Regina Liang
(74) Attorney, Agent, or Firm—Finnegan, Henderson, Farabow, Garrett & Dunner, L.L.P.

(57) ABSTRACT

Image processing technology is provided that makes it possible to easily judge whether or not lock-on is necessary in games that are deployed in virtual space defined in three dimensions, such as is suitable for interactive games. This device comprises an image processing system 200A for subjecting image data defined in three dimensions to prescribed processing and obtaining a train of display image data. The decision object that is to be locked onto is determined by judging whether or not there is two-dimensional superimposition on the display screen between a cursor for locking on and a display object (202). Then, a judgment is made as to whether or not the decision object should be locked onto (203), and, when this is affirmative, the player selects an action which the model he or she is manipulating can take (205).

32 Claims, 12 Drawing Sheets

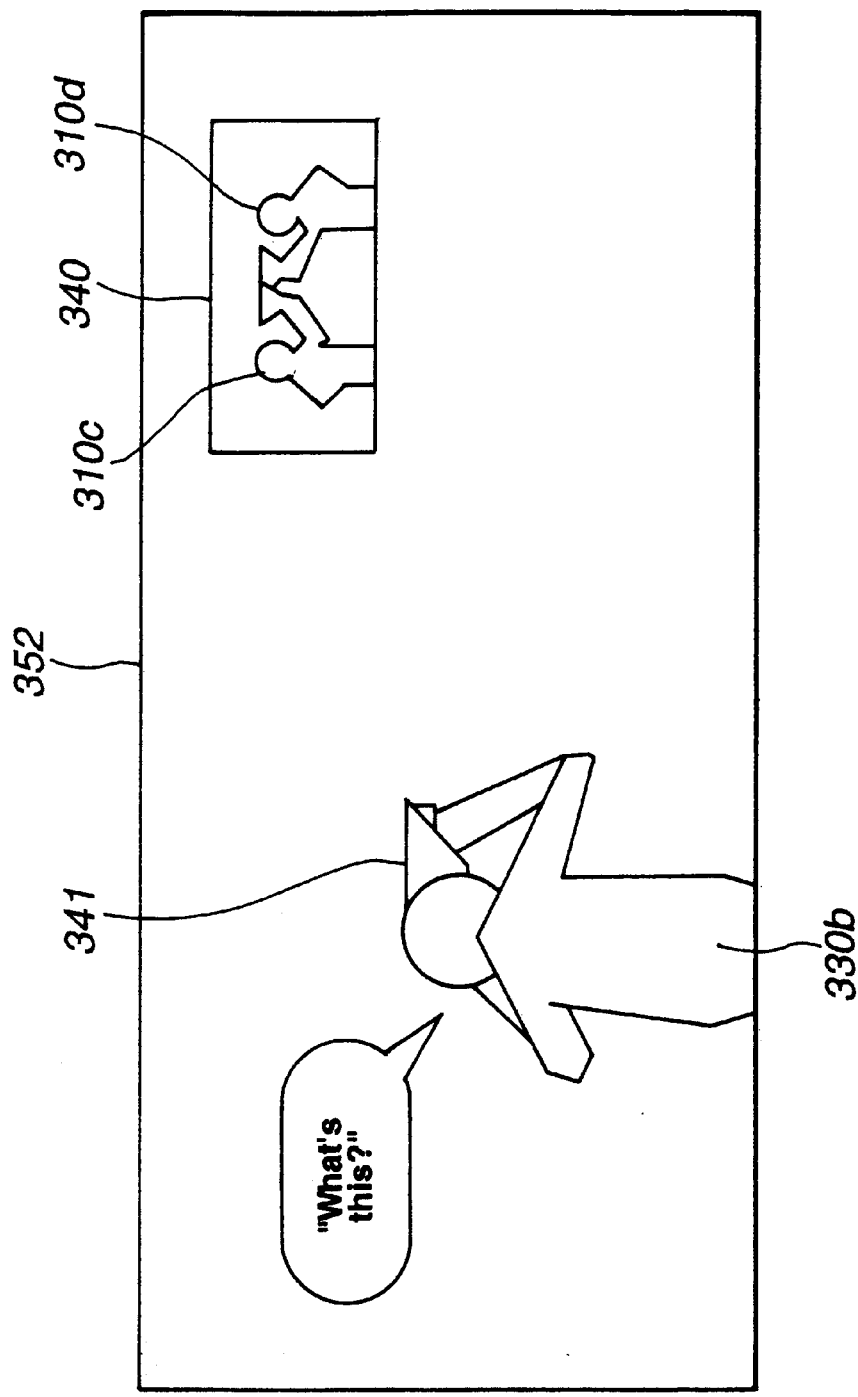

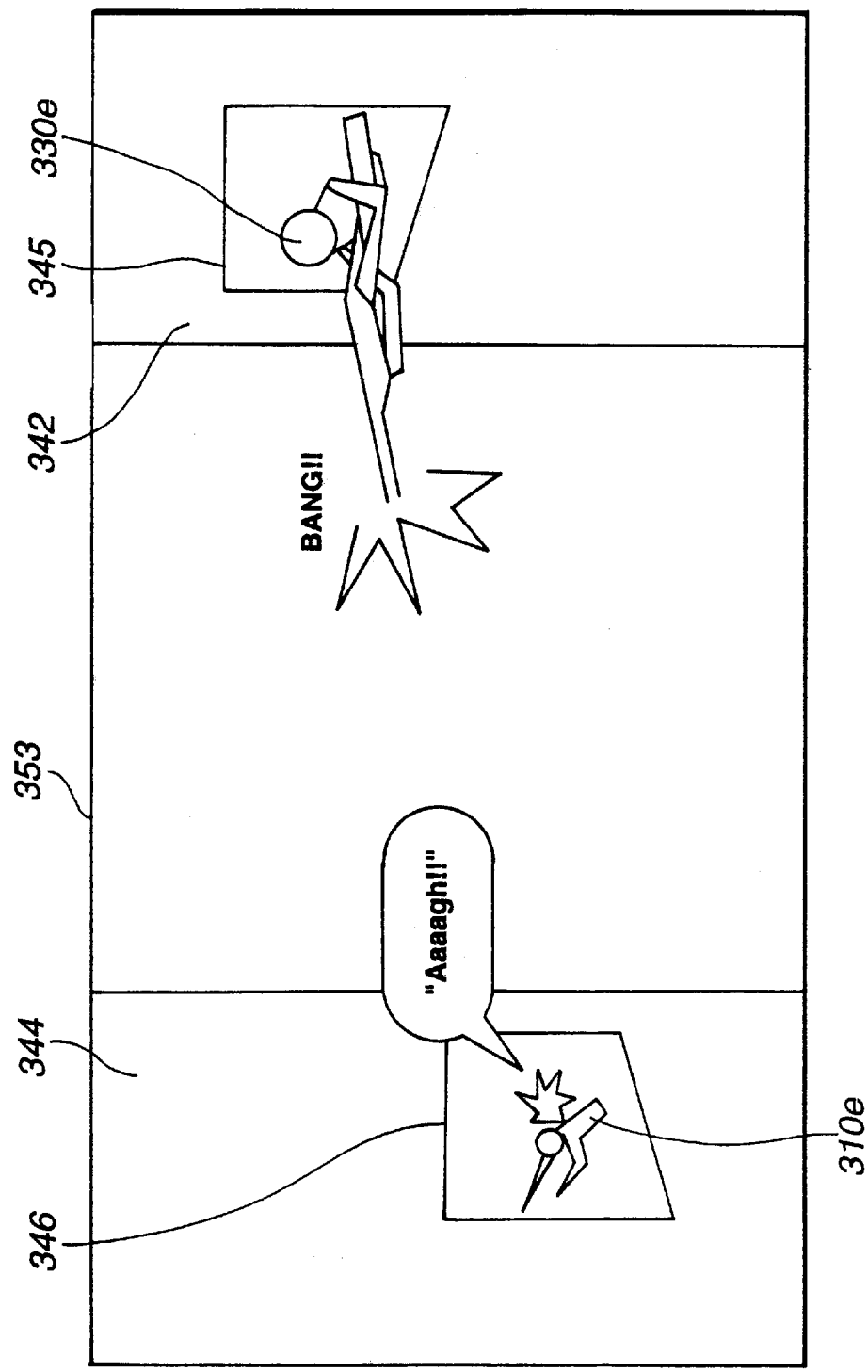

IMAGE PROCESSOR, GAME MACHINE, IMAGE DISPLAY METHOD, AND RECORDING MEDIUM

TECHNICAL FIELD

The present invention relates to image display technology for generating images of models positioned in so-called virtual three-dimensional coordinate space, and more particularly to technology with which it is possible to easily specify capture objects in interactive games that effect conversations, etc., between a plurality of models within virtual space.

BACKGROUND ART

In recent years, in conjunction with the development of computer graphics technology, image processing devices such as video game machines and simulation devices have widely and generally proliferated.

In particular, game devices of a form wherein a three-dimensional space in which multiple segments are positioned is captured from a prescribed visual point and displayed on a monitor as a projection on a two-dimensional screen have high product value. In interactive game devices called role playing games, for example, a player moves a specific segment (hereinafter called a model) in virtual space by moving an input device. This model approaches another segment (which represents a human being or a treasure chest; hereinafter called "(the) target") that is positioned in the virtual space, and communication takes place between the model and the target. By communication is meant, for example, a "conversation" being conducted in which the model and the target person talk to each other, or an interaction such as opening the target treasure chest. The question of whether or not communication has occurred is settled by a contact decision or the like in which a judgment is made as to whether or not there was contact between the model and the target.

In conventional role playing games, this has been done in virtual space defined in two dimensions. Because the virtual space is two-dimensional, the apparent distance between the model and the target on the display screen is the distance between the model and target in the game development, and a player can intuitively grasp the positional relationship between the two.

However, in game devices such as discussed in the foregoing, in which the positions of models and such are specified in three dimensions, it is possible to observe the models and targets as if they existed in the real world, and it is possible to have situations arise wherein the opponent is clearly discernable judging from the mutual positional relationship, even if there is no contact on the display screen. If, even in such cases as this, there is allowed to be no communication unless there is contact between the model and the target, as in conventional game devices defined in two dimensions, the sense of reality will be lacking, and the game will be made uninteresting. If we should hypothetically say that making contact is the condition of communication, then the following troubles arise.

Ordinarily, with game devices defined in three dimensions, a view-change visual point for observing the virtual space is established at some position separated from the visual point of the model. When an obstruction is positioned between the model and the target, although both the model and the target can be seen from the view-change visual point, the situation is one in which the target cannot be discerned from the visual point of the model. In such a case as this, that the model cannot move toward the target is obvious. It becomes necessary, therefore, either to have the model controlled such that it cannot move over or through the obstruction, or to have a display made showing that the model cannot approach the target.

Furthermore, when virtual space is defined in three dimensions, if the coordinates in the depth-dimension of the screen (the direction of the Z axis in the visual point coordinate system) are different, in cases, for example, where the model and target are observed from directly above the plane in the virtual space, even if there is a difference in the coordinate value (height) between the model and target, that difference will hardly appear at all on the display screen, and we can predict that it will then be very difficult to manipulate the model so that it approaches the target.

Also, even assuming that the model has been made to approach the target, the need arises to alter the way the model is oriented so that it faces the target.

In other words, in game devices where a perspective conversion is conducted to convert segments defined in three dimensions to two-dimensional coordinates in order to display them on a monitor, it is believed that various difficulties will arise, as noted above, when methods are adopted which are used in role playing games defined from the beginning in two dimensions.

On the other hand, in terms of a method for specifying a target in a game device defined in three dimensions, there is the publicly known technology of aim fixation (that is, capturing some target as the attack objective; hereinafter also referred to as "lock-on"), used, for example, in conventional game machines which simulate aerial combat.

Thus we can conceive of this technology being used such that a player locks on by overlapping the cursor on the target with which he or she desires to communicate.

However, such conventional game machines that simulate aerial combat simulate the aerial combat within a virtual space that imitates air, so it is presupposed that no obstruction exists between the enemy craft that is the target and one's own craft that is the model. For this reason, this type of game machine that simulates aerial combat does nothing more than judge whether or not the cursor has been overlapped on the enemy craft, and makes no judgment as to whether or not there is an obstruction hindering the attack.

That being so, in game devices wherein it is supposed that an obstruction may intrude between the model and the target, the said conventional lock-on technology cannot be employed as is.

Moreover, conventional lock-on technology is a simple display in which the cursor is merely fixed to a displayed object, making for visual images that lack variation.

SUMMARY OF THE INVENTION

The purpose of the present invention, therefore, is to provide image processing technology with which it is possible to determine whether or not a segment positioned in virtual space is in a condition wherein it can be captured.

More specifically, a first task of the present invention is to judge additional conditions even in cases where a segment is in a position wherein it can be captured.

A second task of the present invention is to make it possible to select the next process in cases where the conditions necessary for capturing a segment have been satisfied.

A third task of the present invention is to bring about changes in the image display of a marker used in capturing.

A fourth task of the present invention is to provide a new capture form in virtual space defined in three dimensions.

And a fifth task of the present invention is to provide a method for specifying the segment that is actually to be captured in cases where a plurality of segments are capable of being captured in virtual space defined in three dimensions.

More specifically, an invention that provides a solution to the first task of the present invention is an image processing device that image-displays a segment positioned within virtual space, and a recording medium that records the method thereof or the program data that implements it, comprising: display position determining means (process) for determining the display position of a marker displayed on a display screen based on manipulation signals; positional relationship determining means (process) for determining whether the condition that a marker determined by said display position determination means (process) be in a prescribed positional relationship relative to said targeted segment has been satisfied or not; situation judging means (process) for judging, in cases where it has been determined by said positional relationship determining means (process) that said marker is in the prescribed positional relationship relative to said targeted segment, whether or not, in addition thereto, said targeted segment satisfies conditions making capture thereof possible; and image displaying means (process) for displaying said marker and for displaying an image indicating the fact that capture has been effected in cases where it has been judged by said situation judging means (process) that said targeted segment satisfies conditions making capture thereof possible. By marker, moreover, is meant something like a cursor that is used to indicate a specific position on a display screen. By segment is meant an aggregate of display elements that is movable as a whole, configured of polygons, for example, meaning a displayed object having such form as to simulate a human being or an object (treasure chest). The display position determining means (process), positional relationship determining means (process), and situation judging means (process) here correspond to processing circuits. The image displaying means (process) corresponds to an image display circuit. By implementing the present invention, an image processing device can be provided which makes it possible to accurately, easily, and quickly judge whether or not the capture of a segment is possible relative to that segment. That being so, when this image processing device is applied to game machines that simulate interactive games in virtual space, for example, accurate judgments are made as to whether or not conditions are satisfied for capturing a targeted segment.

In particular, when a segment is displayed that is manipulated based on the said manipulation signals in virtual space, and it is judged that the targeted segment satisfies the conditions making capture possible, it is preferable that images be displayed showing the interrelationship between the segment being manipulated based on manipulation signals and the targeted segment.

It is also preferable that the condition determined by the positional relationship determining means (process) be that the marker and the targeted segment be overlapped on the display screen. It is further preferable that the condition of capture capability judged by the situation judging means (process) be that of determining whether or not the targeted segment is a process object of the image displaying means (process).

An invention that provides a solution to the second task noted above additionally provides, in cases where the targeted segment is capable of capture, an action selecting means (process) for displaying a plurality of selection branches that indicate the action(s) to be taken next, wherein the image displaying means (process) displays images based on input manipulation signals corresponding to selection branches displayed by the action selection means (process).

An invention that provides a solution to the third task noted above alters the display form of the marker according to the type of segment targeted.

An invention that provides a solution to the fourth task noted above alters the content of the image display according to the distance between the said marker and the said targeted segment.

An invention that provides a solution to the fifth task noted above computes distance from the visual point for image display for each segment that is overlapped within a decision range established about the marker, and determines the segment having the shortest computed distance to be a targeted segment which satisfies the said conditions. Accordingly, by making the configuration such that, in cases where a plurality of display objects exist overlapped as viewed from a prescribed visual point within the virtual space, the segment that is closest to the visual point is determined to be the target, and then a judgment is made as to whether or not this target is capable of capture. In the event that there is an obstruction in the vicinity of the segment to be captured, a segment hidden by such obstruction is prevented from being captured.

By recording medium, moreover, is meant something on which information (mainly digital data, programs) is recorded by some kind of physical means or other, being such as can have the requisite function performed by a processing device such as a computer or dedicated processor. In other words, this need only be something that can download programs into a computer by some means or other and cause the requisite function to be performed. Included in such media are, for example, flexible disks, hard disks, magnetic tape, photomagnetic disks, CD-ROMs, DVDs, ROM cartridges, RAM memory cartridges equipped with battery back-up, flash memory cartridges, and non-volatile RAM cartridges. These shall extend to cases where data transfers are received from a host computer via wire or wireless communications lines (public lines, dedicated data lines, satellite circuits, etc.). The so-called Internet is also to be included in the recording media spoken of here.

BRIEF DESCRIPTION OF THE DRAWINGS

FIG. 8 is a diagram depicting an example of a screen that can be produced using the said image processing system;

FIG. 9 is a diagram depicting an example of a screen that can be produced using the said image processing system;

BEST MODE FOR CARRYING OUT THE INVENTION

Preferable embodiments of the present invention will now be described, making reference to the drawings. One embodiment of the present invention will be described with reference to FIGS. 1–6. This embodiment is an application of the image processing device of the present invention to a TV game machine for home use.

Device Configuration

Figure 1:
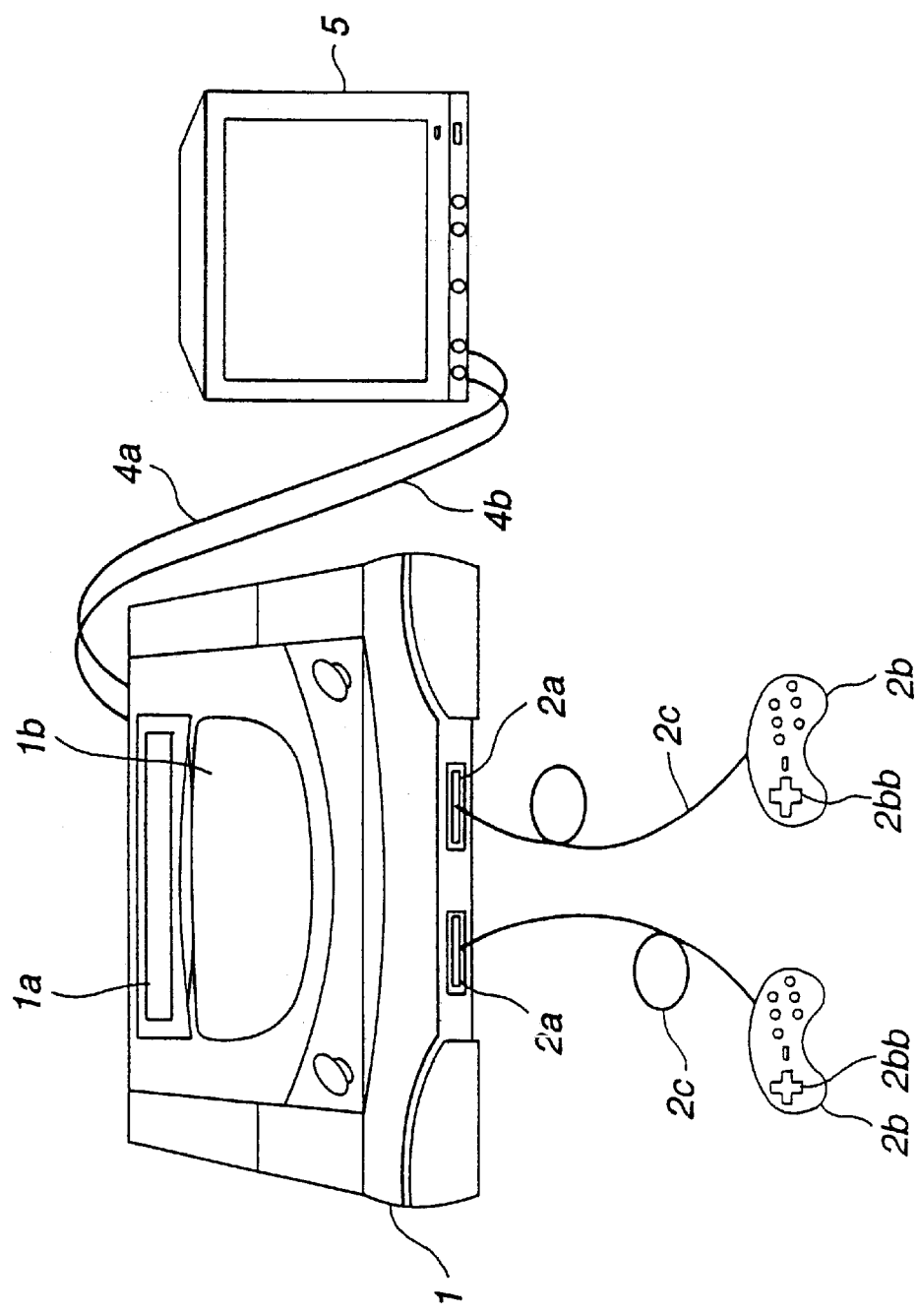
FIG. 1 is an overall diagonal view of an embodiment form of a TV game machine in which the image processing device of the present invention has been applied.

FIG. 1 is a diagonal view of the exterior of a game machine to which the present invention pertains. As indicated in FIG. 1, the game device of this form comprises a game device main unit 1, pads 2b, and a monitor 5.

An image/voice processing device of this invention is housed inside the game device main unit. On the exterior thereof there is provided an interface (I/F) unit 1a for connecting ROM cartridges, and a CD-ROM drive 1b for reading CD-ROMS. The pads 2b are equipped with cross-shaped cursors 2bb and multiple manipulation buttons, and are configured such that manipulation signals can be generated based on the manipulations of a player. The configuration is also such that the manipulation signals can be supplied to connectors 2a via cables 2c. The pads 2b are provided such that they can be attached to and detached from the game device main unit 1 by the connectors 2a, the configuration being such as to allow two pads to be connected so that two players may play at the same time. The configuration may also be such that mice, remote controls, or keyboards, etc., are connected instead of pads. The configuration is also such that the monitor 5 is connected to a video output terminal Vo and audio output terminal Ao (not shown in the drawing) of the game device main unit 1 via a video cable 4a and an audio cable 4b.

Figure 2:
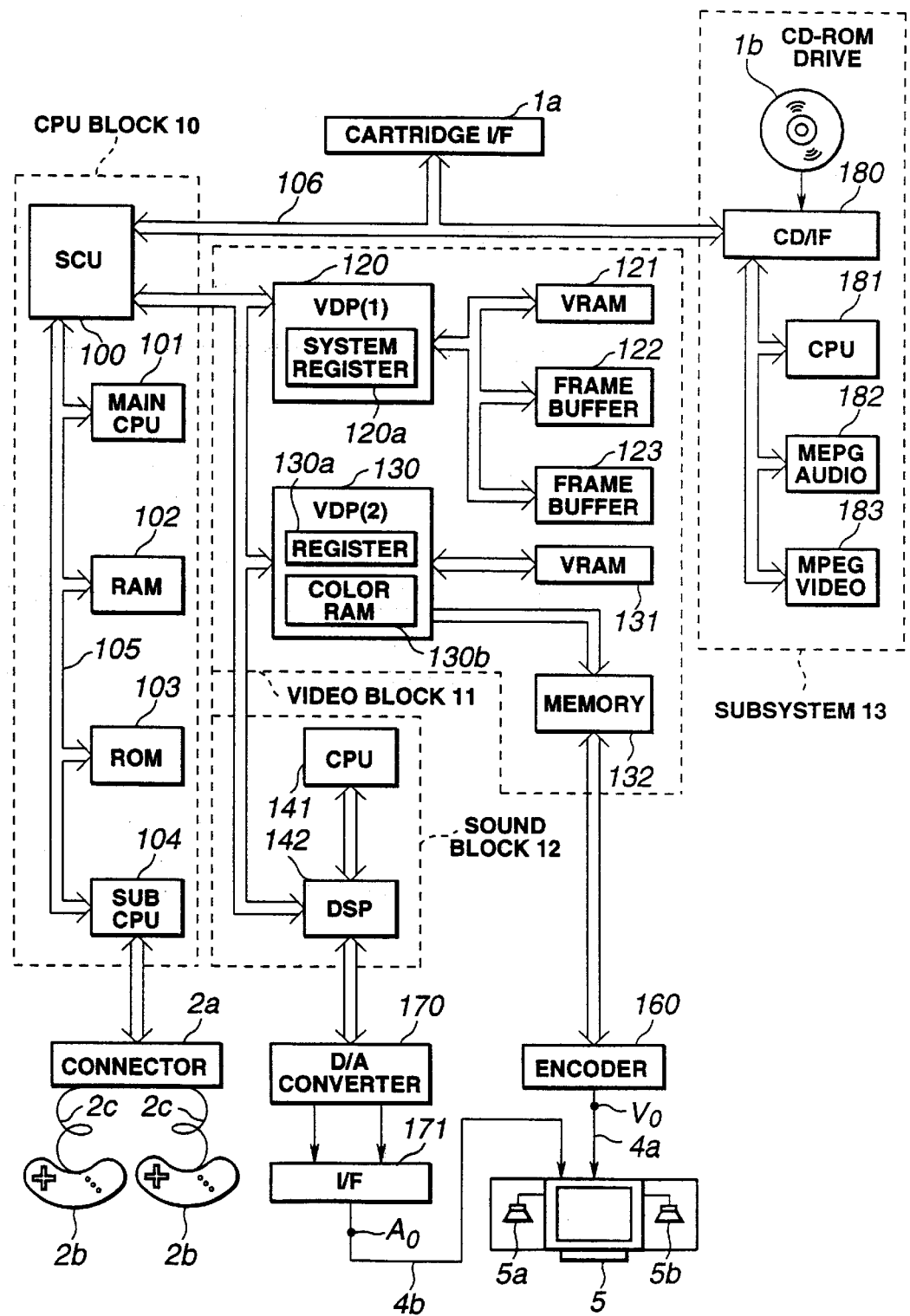
FIG. 2 is a block diagram exhibiting the simplified configuration of the said TV game machine.

In FIG. 2 is given a block diagram of a game device in which the image processing device of the present invention is applied. As shown in FIG. 2, this game device is made up of a CPU block 10, a video block 11, a sound block 12, and a subsystem 13.

CPU Block

The CPU block carries on game processing according to the program, and, at the same time, controls the image processing of the present invention. It is made up of an SCU (system control unit) 100, main CPU 101, RAM 102, ROM 103, sub-CPU 104, and CPU bus 105, etc. The main CPU 101 comprises an internal DSP (digital signal processor) and is configured such that it can execute processing at high speed based on program data sent to it from the CD-ROM 1. The RAM 102 is configured so that it can be used as a cache memory for application software program data read from the CD-ROM 1, audio control program data, waveform data, a work area when performing MPEG image decoding, and for data used in correcting errors during CD-ROM decoding. The ROM 103 is configured so that it can store initial program data for initializing processes for the device.

The SCU 100 is configured such that the transfer of data via busses 105, 106, and 107 can be coordinated. This SCU 100 is equipped internally with a DMA controller, and is configured so that, during game execution, it can transfer needed image data to the VRAM inside the video block 11 and can transfer audio control program data and waveform data to the sound block 12. The sub-CPU 104 is called an SMPC (system manager & peripheral controller). It is configured so that it can collect manipulation signals from the pads 2b in response to requests by the main CPU 101.

Video Block

The video block 11 is configured so that it can execute the image processing of the present invention, comprising a VDP (video display processor) 120, VDP 130, VRAM 121, frame buffers 122 and 123, VRAM 131 and memory 132.

The VRAM 121 is configured so that it can store drawing commands sent via the SCU 100 by the main CPU 101. The VDP 120 is configured so that, based on drawing commands stored in the VRAM 121, it can generate polygon data or bitmap-form image data based on bitmap data, alter shapes, and perform color operations such as shadows or shading, and so that it can write the generated image data to the frame buffers 122 and 123.

The frame buffers 122 and 123 are configured so that they can store the image data that the VDP 120 causes to be generated. The VRAM 131 is configured so that it can store data tables, etc., needed to effect VDP 130 functions.

The VDP 130 is configured so that, based on the image data stored in the frame buffers 122 and 123, it can perform such image processing as window processing for setting selection boxes, shadow-adding processing, enlarging, reducing, rotating, mosaic processing, moving processing, and shaded-surface processing such as clipping and display priority processing, and can store display image data in the memory 132.

The memory 132 is configured so that image data for drawing by the VDP 130 are stored, and so that such can be output to an encoder 160. The encoder 160 is configured so that image data for drawing stored in the memory 132 can be converted to a video signal format, subjected to D/A conversion, and supplied to the monitor 5 via the video output terminal Vo.

The TV receiver 5 is configured so that it can display images on the display unit based on the supplied video signals.

Sound Block

The sound block 12 is made up of a DSP 140 and CPU 141. The CPU 141 is configured so that it can send waveform data and audio control program data transferred from the main CPU 101 to the DSP 140. The DSP 140 is configured with an internal audio memory. It is configured so that, under the control of the CPU 141, it performs waveform generation based on a PCM audio source or FM audio source, referencing the waveform data, delay data generation, and sound synthesizing, and so that it can output the generated audio data to a D/A converter 170. The DSP 140 is equipped with functions for performing frequency control, volume control, FM operations, modulation, sound synthesis, and reverb, etc., by means of these actions. The D/A converter 170 is configured so that it can take the audio data generated by the DSP 140 and convert them to 2-channel signals, and supply these to speakers 5a and 5b via the audio output terminal Ao.

Subsystem

Figure 3:
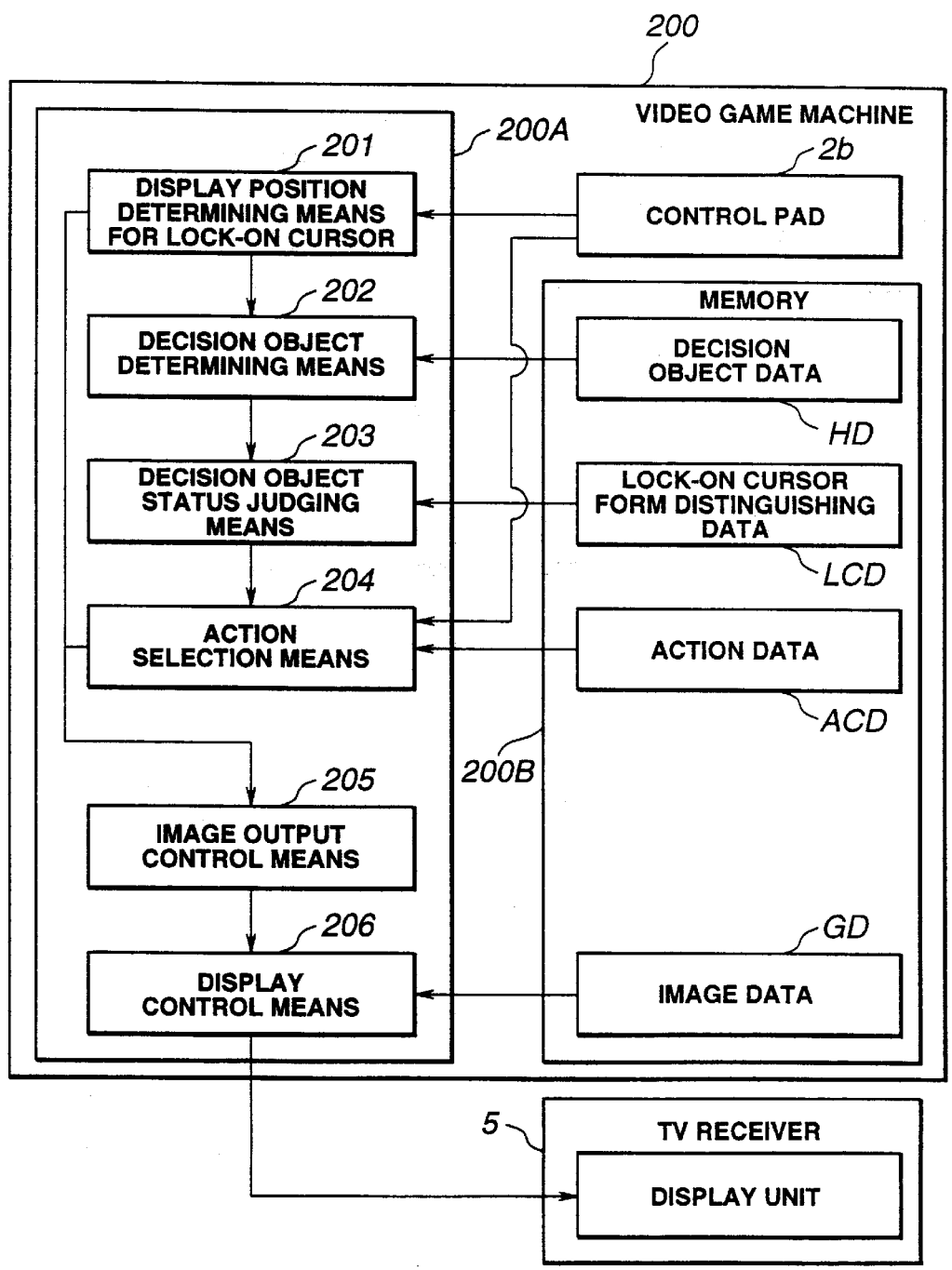
FIG. 3 is a function block diagram exhibiting the image processing system of the said TV game machine.

The subsystem 13 is made up of a CD-ROM driver 1b, CD interface (I/F) 180, CPU 181, MPEG audio circuit 182, and MPEG video circuit 183. The CD-ROM driver 1b is configured so that it can read application software program data, image data, audio control program data, and waveform data from a CD-ROM, and the CD interface 180 is configured so that it can supply these data to the CPU block 10. The CPU 181 is configured so that it controls the MPEG audio circuit 182 and MPEG video circuit 183 and so that it can decode audio data and image data that have been high-efficiency encoded and compressed by MPEG storage. FIG. 3 is a functional block diagram of the image processing system embodied by the game machine diagrammed in FIG. 2. Explaining FIG. 3 with reference to FIG. 2, an image processing system 200A is implemented with a CPU block 10 (comprising primarily the main CPU 101), while a memory 200B is configured of RAM 102 (and, when necessary, of ROM 103 also).

As is indicated in FIG. 3, manipulation data from the pads 2b are input to the image processing system 200A. And it is possible to access various kinds of data from the memory 200B. To the memory 200B are transferred the image data, audio control data, and program data needed for game processing from a CD-ROM or ROM cartridge. The configuration also makes it possible to store various types of data computed by the image processing system 200A in the memory 200B.

As indicated in FIG. 3, the image processing system 200A of the game machine 200 comprises: a display position determining means 201 (corresponding to S401 and S402 in FIG. 4 discussed below) that determines the cursor display position; a decision-object determining means 202 (corresponding to S403 through S409 discussed below) that determines decision display objects (called targeted segments); a decision-object status-judging means 203 (corresponding to S411 discussed below) that judges the status of a decision display object designated by the cursor, that is to say, judges whether or not it is an object that may be captured; an action selection means 204 (corresponding to S412 and S413 discussed below) which can make selections of content that a player can adopt next after a capture; an image output control means 205 that controls image output from processing results from said means 201, 202, and 204; and a display control means 206 that forms video signals based on image data stored in memory 200B under the control of means 205.

The display control means (circuit) 206 takes the image data GD stored in memory 200B, forms it into video signals, and supplies these to the TV receiver 5. The image output control means 205 and display control circuit 206 are effected mainly by the CPU block 10, video block 11, and encoder 160.

In the following, we refer to a cursor used as a sight for capturing a specific segment as a target as the "lock-on cursor." Decision-object data HD are given to the determining means 202 for decision objects. Lock-on cursor data LCD are given to the decision-object status-judging means 203, and action data ACD are given to the action selection means 204. The content of the decision-object data, lock-on cursor form-distinguishing data LCD, and action data ACD will be explained below with the flow chart depicted in FIG. 4. Image data GD are given to the display control means 206. The data from the cross key 2bb, for example, of a pad 2b are given to the action selection means 204.

Figure 4:
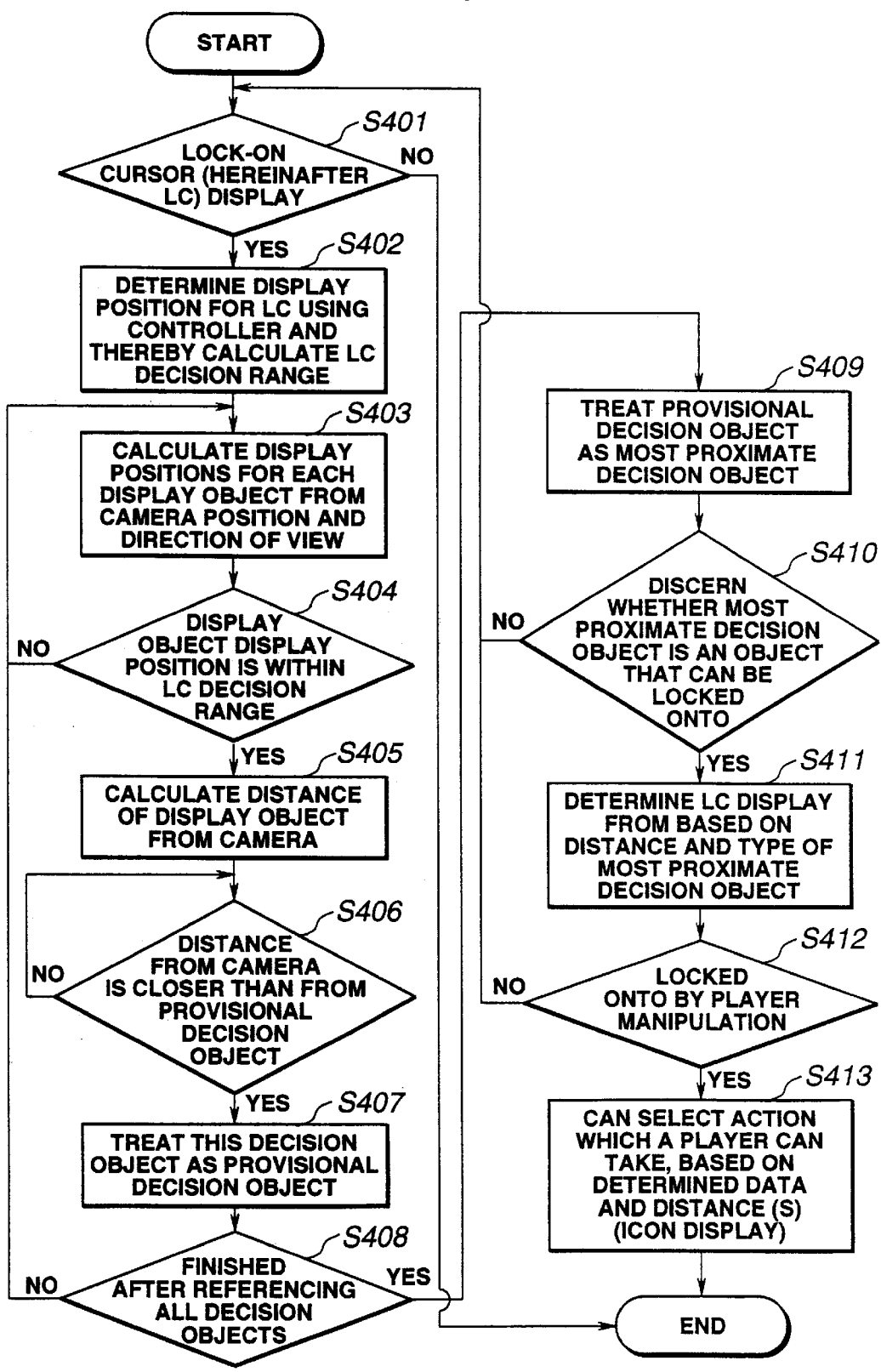
FIG. 4 is a flow chart for image processing performed by the said TV game machine.

The operation of this embodiment is next described. FIG. 4 is a flow chart that diagrams the image processing operations in the image processing system discussed above. FIG. 5 and FIG. 6 are explanatory diagrams representing examples of screens displayed on the screen of the TV receiver 5 when the image processing system processes the flow chart in FIG. 4. The example used in this description is that of a role playing game wherein segments are positioned and processed within virtual space defined in three dimensions.

Figure 5A:
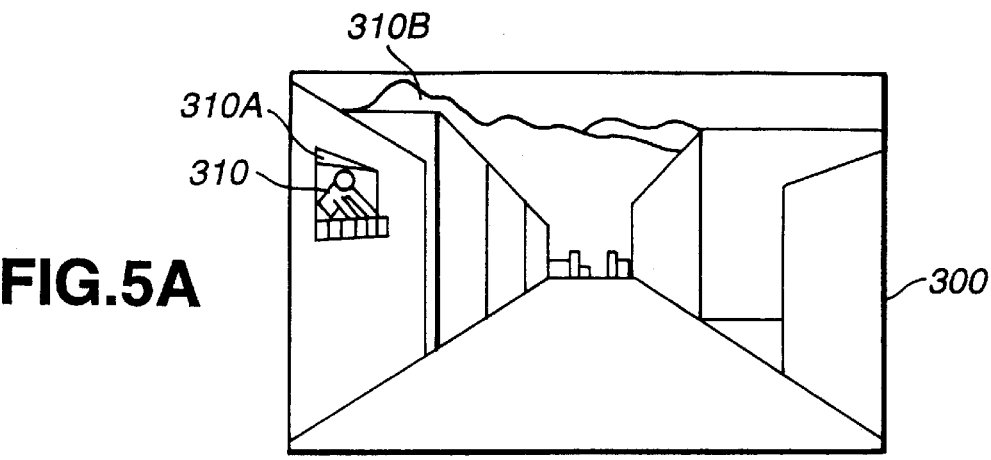
FIGS. 5A–5D are diagrams of screens displayed by a TV receiver when the said flow chart is processed.
Figure 6A:
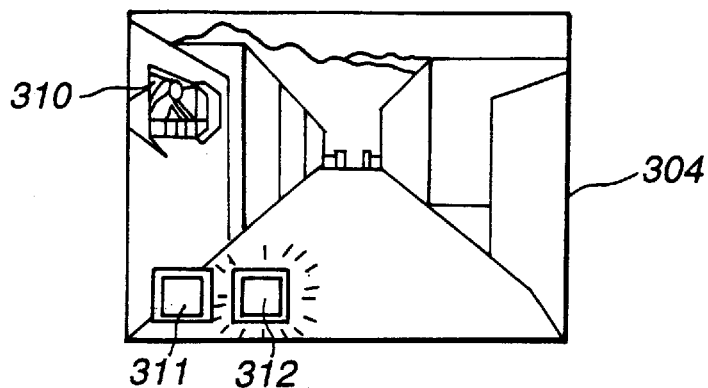
FIGS. 6A–6C are diagrams of screens displayed by a TV receiver when the said flow chart is processed.

First, the CPU block 10 executes the application software (game program), causing the video block 11 to go into operation, whereupon the screen 300 exhibited in FIG. 5A, for example, is displayed on the display unit of the TV receiver 5. At this time, a display object 310 susceptible to lock-on is to be displayed inside this screen 300. This "lock-on" processing is described next.

Figure 5B:
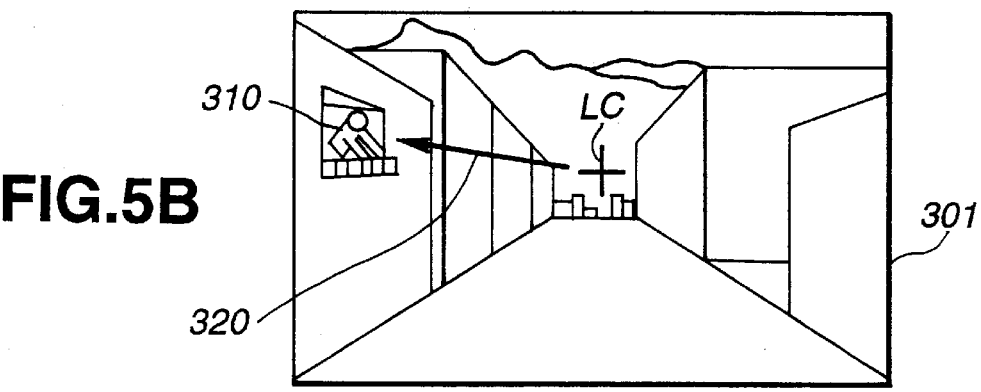

Let it be assumed that the screens in FIG. 5A and 5B are scenes viewed from the visual point of a model (such as a segment simulating a human being, for example) that a player can manipulate. This model can exchange communications by conversation or actions with the display object 310 (which is also assumed to virtually simulate a human being). When this is so, a condition wherein it is determined that a mode permitting this communication is entered into, or a condition wherein it is requested that this mode be entered into, is "lock-on." The content of lock-on in this case is roughly the same as "lock-on" in the aerial combat simulation games discussed earlier.

In other words, lock-on refers to the making of a display object designated by a lock-on cursor as the object of processing. In the case where the display object is a human being, for example, it refers to a display object becoming a target when a player, by his or her manipulation, contacts or approaches that object, and begins a conversation or an action. In cases where the display object is an entity other than a human being, such as a "treasure chest," lock-on refers to it being made a target, with a model manipulated by a player approaching the treasure chest and taking some action such as opening the lid of the treasure chest.

In the present invention, a lock-on cursor is expressed by the generic term "mark." Moreover, a chain of actions taken for the purpose of locking on, such as causing the model one is manipulating to approach the display object 310, or to make contact therewith, etc., for the purpose of effecting communication, for example, is defined as "accessing."

A player determines the lock-on cursor display (step S401) by manipulating a pad 2b. In a case where, for example, a display object is displayed on the screen, and a player desires to communicate with that display object 310, he or she can display that lock-on cursor. It is possible to make this selection by depressing a prescribed button on the pad 2b. If that button is depressed, the access mode, that is, the lock-on mode, is provided for the player.

When a determination is made to display a lock-on cursor, a lock-on cursor LC such as depicted in FIG. 5B is displayed inside the screen 301 that is displayed on the display unit of the TV receiver 5. In this embodiment the lock-on cursor LC is shaped as a cross, but it need not be so; it may have a square or round or triangular shape. As will be discussed subsequently, the shape of this cursor can be altered, depending on the display object type. Furthermore, in cases where no determination is made to display the lock-on cursor LC (S401; NO), the flowchart in FIG. 4 is exited. In that case, it impossible,for example, to make the character itself that one is manipulating approach a display object in three-dimensional space and to effect communication between [the character] and the display object.

When a selection to display the lock-on cursor has been made (S401; YES), a player tries to manipulate a peripheral 2b so as to move the lock-on cursor LC in the screen 301 in the direction of the arrow 320 shown in the diagram and thereby lock onto the display object 310 (S402). In other words, as indicated in FIG. 5B, the player can manipulate the cross key 2bb of a pad 2b depicted in FIG. 1, and move the cursor in the direction of the arrow 320, so as to overlap the lock-on cursor on the display object 310. In cases where a person plays alone, only one of the two pads 2b need be present.

Now, when the display position of a lock-on cursor LC that designates a display object has been determined, the display position determining means 201 that is implemented by the main CPU 101 computes a fixed range that is decided by that lock-on cursor, and has this stored in RAM 102 (S402). In other words, it is possible to make that range be the screen coordinates inside a circle that connects the tips of the cross of the lock-on cursor, for example. Hereinafter this range shall be referred to as the lock-on cursor decision range.

Next, the display position of this lock-on cursor and the range wherein the lock-on cursor can decide whether or not lock-on is effected are computed. Now, by means of step 403, the image data for the display object in the virtual space defined in three dimensions are converted to image data defined by the coordinates of a system of visual field coordinates, from the position of the visual point and the direction of the line of vision. Then, these image data are subjected to perspective projection (perspective conversion), and converted to image data defined by two-dimensional coordinates.

All of these conversions are performed using image processing technology that is publicly known. Here, by display objects are meant the person 310, building 310A, and the mountain-like background 310B in FIG. 5A. These are displayed as two-dimensional images on the display screen of the TV receiver, as depicted in FIG. 5. Ordinarily, the background images are displayed by image data defined by two-dimensional coordinates, while the other display-object segments are made up of polygons.

Next, in step 404, a decision is made as to whether or not the lock-on cursor range contains the two-dimensional display positions for these display objects on the display screen. A decision is made, for example, as to whether or not there is a superimposition of figures, in whole or in part, between the lock-on cursor and a display object. In this decision, when it is decided that the display object 310 is not inside the control cursor decision range (S404; NO), step 403 processing is returned to. In order to facilitate this superimposition decision, moreover, it is possible to substitute a simplified model, such as a circle or ellipse, for the display object, and then to decide on the degree of superimposition.

When this decision of step 404 is in the affirmative, the distance from the visual point (camera) to the display object in the three-dimensional coordinate system is computed. Display objects that are subject to the computation of such distances are referred to a decision objects. After that, the decision display object locked onto is determined, by steps 404 through 409. Before describing each of these steps, however, an explanation is here given of the principle used in determining this decision object.

Figure 11:
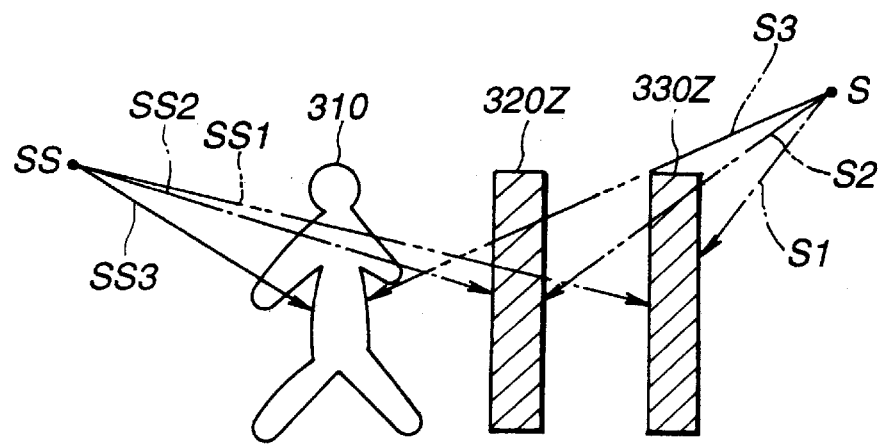
FIG. 11 is a conceptual diagram indicating the position of a decision display object within virtual space.
Figure 12:
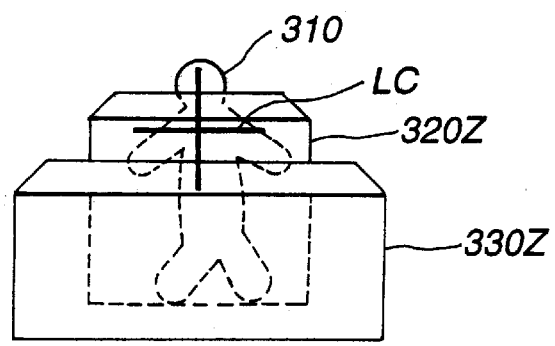
FIG. 12 is a diagram of a screen as seen from visual point S of FIG. 11.

FIG. 11 is a schematic diagram that indicates the position of a display object in virtual space. Item310 is a display object that corresponds to a person, discussed earlier. Items 320Z and 330Z are also display objects, but are actually obstructions (such as walls) that are not to be locked onto. S is the visual point (hereinafter referred to as the camera in the sense of projecting objects in virtual space). S1 and S2 denote distances to the display objects from the visual point S. FIG. 12 depicts a screen shown by the TV receiver, looking at these display objects from the visual point S.

As may be seen from FIG. 12, in the virtual space, the wall 330Z is positioned the closest, as viewed from the visual point, with the other wall 320Z and the person 310 displayed hidden by the first wall 330Z. Given the condition in this diagram, even though the lock-on cursor LC be overlapped on the person 310, that person 310 is hidden in the shadow of the walls 330Z and 320Z, so that person should not be locked onto. If decisions are made simplistically on superimposition, it cannot be judged what one is trying to lock onto, whether the person or a wall.

Figure 13:
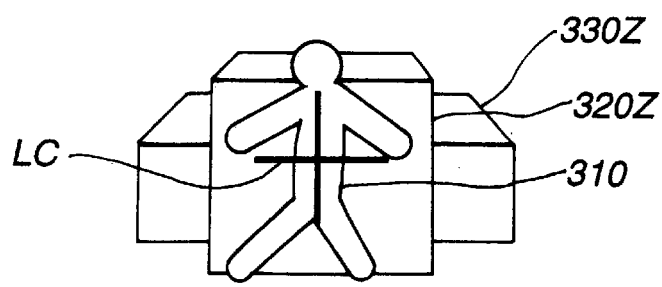
FIG. 13 is a diagram of a screen as seen from visual point SS of FIG. 11.

On the other hand, in FIG. 11, in the screen as seen from visual point SS, as depicted in FIG. 13, the person 310 comes closest into the foreground. When the lock-on cursor LC is overlapped on this person 310, therefore, that person 310 may well be locked onto.

Steps 405 through 410 are processes for making this judgment. Now, in setting forth the description here, it is assumed that one or more obstructions exist in front of the person, as in the case in FIG. 11 where aim is taken at the person from the visual point S. In step 405, the distances S1 through S3 (cf. FIG. 11) between the visual point and each display object are calculated, referencing the positional data for each display object and the visual point positional data. These distances are calculated, for example, as the distance from the visual point to the center (geometric center of gravity) of the display object. Next, in step 406, the person 310 is first of all set as the provisional decision display object. Then a comparison is made between the distance S2 between the wall 320Z and the visual point, and the distance S3 between the person and the visual point. Because S2 is smaller than S3 (S406; YES), that is, because the wall 320Z is in front of the person 310, the provisional decision object is changed from the person 310 to the wall 320Z (S407).

After that, step 408 is transitioned to, and, when these processes have been executed for all of the display objects, the wall 330Z ultimately becomes the provisional decision object (S409). In other words, the most proximate decision object as seen from the visual point S is determined. In step 405, the initial provisional decision object was set as the person 310, but this may be set as either of the walls 320Z or 330Z. Regardless of what display object is set, ultimately the wall 330Z will be decided on as the provisional decision object, and step 409 will be advanced to. When the wall 330Z is set as the initial provisional decision object, in step 407, the provisional decision object will not be changed to another display object (310 or 320Z). It is also permissible to set a flag in the data group for the most proximate decision object (330Z) to indicate that it is the most proximate decision object.

When the visual point is at the position of visual point SS in FIG. 11, on the other hand, it will be decided that the person 310 is the ultimate decision object (most proximate decision object). The decision object data of FIG. 3 correspond, for example, to the distance between a display object and the visual point as explained here, or to a flag indicating that it is the most proximate decision object. In step 410, a decision is made as to whether this most proximate decision object can be locked onto or not. The purpose of lock-on is to achieve communication with a display object (in the case of role playing games). Accordingly, a wall, which is a stationary object, is not handled as a lock-on object. In this case, step 401 will be returned to, and no lock-on processing will be performed.

On the other hand, if the decision object is changed from a wall 320Z or 330Z to a person, the most proximate decision object may be handled as a lock-on object. In fact, it is even permissible to make it possible to lock onto the walls themselves. In other words, the question of whether or not a display object can be locked onto is a matter that can be established in a game program in any way desired. The question of whether or not a display object can be locked onto can be easily decided by making a judgment using a prescribed flag.

Once it has been decided that the most proximate decision object is an object that can be locked onto, there is a transition from step 410 to step 411. Instep 411, one may alter the display shape of the lock-on cursor, according to the type of the most proximate decision object, from the cross shape already described. If, for example, the lock-on decision object is a friendly model that is not an enemy of the player in a game program, one may make the lock-on cursor a circle shape, or, if it is an enemy, the lock-on cursor may be displayed as a triangular shape (such, for example, as an equilateral triangle), etc. It is possible to do this by setting, beforehand, flags that specify a type for each decision object. By altering the display form of the lock-on cursor, it becomes possible for the player to accurately and quickly perceive the type of decision object being locked onto from the display form of the lock-on cursor. The lock-on cursor form-distinguishing data LCD of FIG. 3 refer to this type of flag (etc.) data. If one checks the flag that is set to the most proximate decision object, one may quickly judge what form of cursor it is necessary to display.

Step 412 judges whether a player is permitted to lock on, that is, whether or not the completion of a lock-on has been confirmed by a player by depressing a prescribed button on a pad 2b.

Figure 5C:
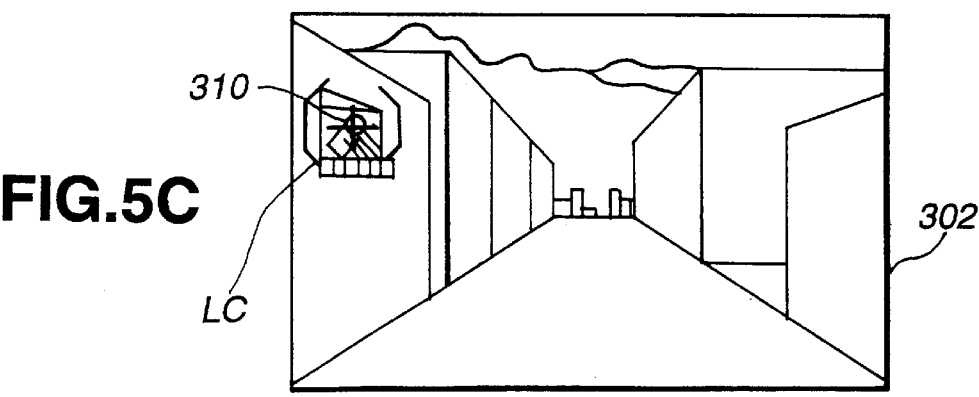
Figure 5D:
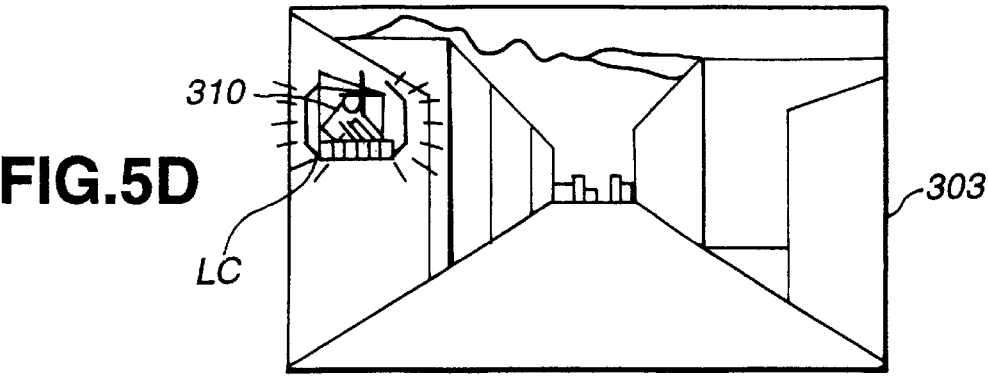

In screen 302 shown in FIG. 5C, the lock-on cursor is overlapped on the person 310, who is a display object, it has been decided that that person is the most proximate decision object, it has been judged in step 410 that this is an object which can be locked onto, the lock-on cursor, due to step 411, has a cross positioned in the center, and the form is made such that it exists as an entire mark LC having angular brackets positioned around it.

When the player manipulates the pad 2b to stop the lock-on (S412; NO), step 401 is returned to. When the player has manipulated the pad 2b to do a lock-on (S412; YES), the brightness of the lock-on cursor is increased, as depicted in screen 303 in FIG. 5D, thereby informing the player(s) that lock-on is complete.

Figure 6B:
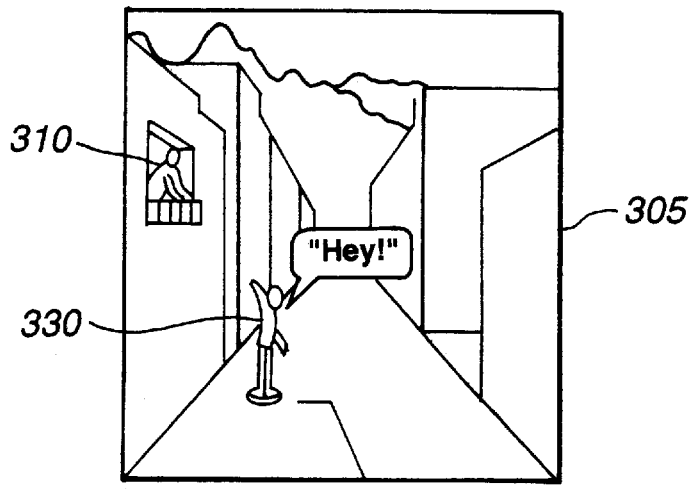

Then, in step 413, there is a transition to screen 304 in FIG. 6. Not only does the lock-on cursor disappear from the screen, but selection branches indicating actions that a player can execute are displayed on the screen in the form of icons (311, 312), respectively. The player uses the cross key on the pad to select the desired icon from among the selection branches, and thereby selects the desired action. The actions indicated by the selection branches are something like making a salutation from a distance (icon 311), or going into the building and making a salutation up close (icon 312). Needless to say, the content of the selection branches can be set appropriately according to the story line in the game. By selecting icon 311, the access screen 305 is displayed, wherein the model 330 being manipulated by the player is displayed on the screen, and a salutation "Hey!" is made from afar to the person that is the decision object (FIG. 6B). The action data ACD of FIG. 3 refer to data for deploying on the screen actions selected by each icon.

Figure 6C:
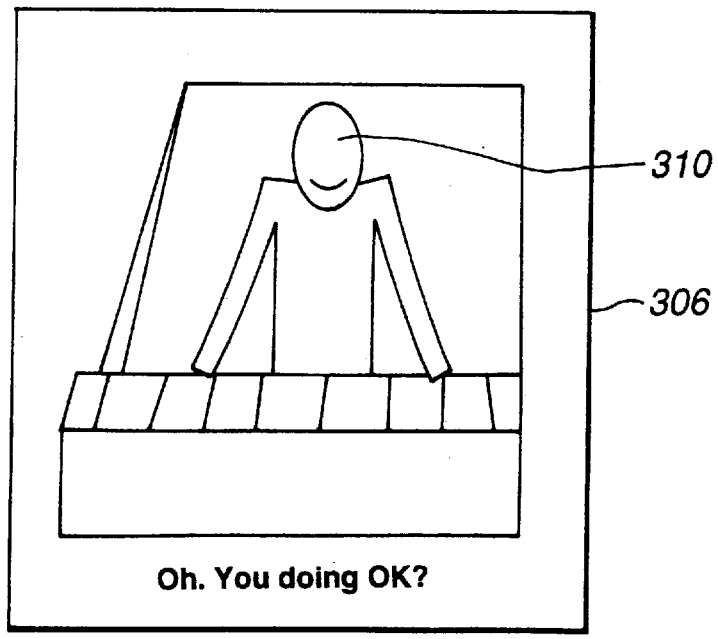

When this is done, a screen like 306, depicted in FIG. 6C, as seen from the visual point of the model being manipulated by the player, is displayed on the screen of the TV receiver 5. In this screen 306, the display object 310 is displayed in a form such as the model being manipulated by the player would see looking up. The display object 310 says "Hey! How y'doing?"(displaying a message), and communication is effected between the two.

Now, in the case of a positional relationship such as that where the display objects 310, 320Z, and 330Z are seen in virtual space from the visual point SS in FIG. 11, the most proximate decision object is determined to be the person 310 (cf. 13 in FIG. 13), and it is decided that it is possible to lock onto that person (S410).

As discussed earlier, if the lock-on cursor is moved so as to be overlapped on the display object 310, as depicted in FIG. 5B and 5C, lock-on becomes possible. Accordingly, this fact affords the following advantages to a roll playing game system in virtual space defined in three dimensions.

A player moves the model he or she is manipulating in virtual space defined in three dimensions, and carries on the game while verifying, from a prescribed visual point, whether or not his or her model has made contact with a display object. The screen on the display unit of the TV receiver 5 takes the image data defined in three dimensions and perspective converts it to two-dimensional coordinates. If one attempts to determine whether or not communication has been effected by the conventional presence or absence of contact, it will be demanded of the players that they seek segment contact in virtual space defined in three dimensions while watching a display screen displayed in two dimensions. This demands considerable skill. It will be necessary, for example, to accurately grasp the sense of distance from the display object 310, to make small positional adjustments in the model being manipulated by the player as it approaches the display object 310, and to take care that the model is properly facing the display object 310 (so that both characters are facing each other).

However, if one causes the lock-on cursor to be overlapped on the display object 310, as depicted in FIG. 5B and 5C, it is possible to effect lock-on easily. Accordingly, it becomes possible to achieve target capture easily and quickly, even though no contact is effected on the three-dimensional coordinates between the person310 and the model that one is manipulating, and even though one is not skilled at the manipulation.

Figure 7A:
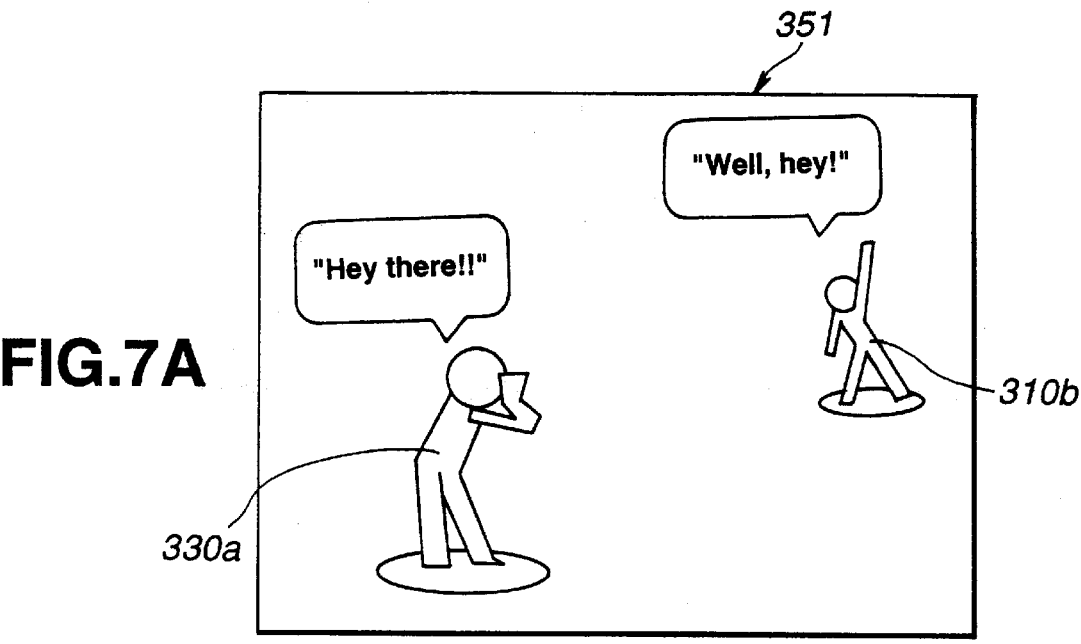
FIGS. 7A–7B are diagrams depicting examples of screens that can be produced using the said image processing system.
Figure 7B:
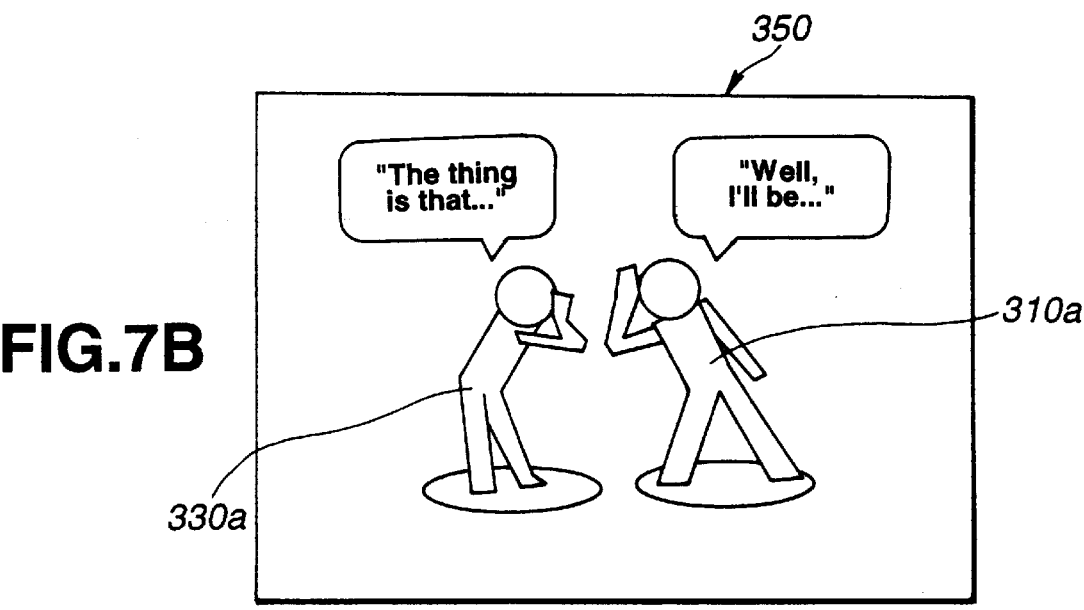

In FIG. 7 is depicted example displays in a case where the present invention is applied to a game. FIG. 7A is an example display wherein a display object 310a and a model 330a being manipulated by a player are separated from each other. FIG. 7B depicts a situation wherein the display object 310b and the model 330a being manipulated by the player are close to each other.

The relationship between the model 330a and display object 310a is here explained, making use of FIG. 7A. Let it be assumed, firstly, that screen 351, depicting a situation where the character 330a and the display object 310a are separated from each other, is being displayed on the screen of the TV receiver 5. A player determines the display of the lock-on cursor, and manipulates a pad 2b. By this being done, the flow chart in FIG. 4 is executed by the image processing system 200A. Then, the player moves the said lock-on cursor LC and tries to lock onto the display object 310a. By so doing, when lock-on impossible, the display object 310a is locked onto. When this is done, a condition is created wherein access becomes possible between the model 330a being manipulated by oneself and the display object 310a within screen 351. Screen 351 can be displayed, for example, wherein, in screen 351, the model 330a says "Hey there!!" to the display object 310a, and the display object 310a replies "Well hey!" to the model 330a. Then screen 350 of FIG. 7B, exhibiting a situation where the communication in screen 351 of FIG. 7A has advanced further, is displayed. In other words, after the model 330a has made a salutation to the person 310, as a display object, from a distance (FIG. 7A), they come closer to each other, and a conversation begins, with the model 30a saying "The thing is that . . . " in the ear of the person 310b, and the person 310b replying "Well I'll be."

In FIG. 8 is depicted another example of communication. On the display unit of the TV receiver 5 is displayed a screen 352 wherein the model 330b is using binoculars 341 to observe two display objects 310c and 310d that can be seen through a distant window 340. Let it be assumed here that a player has locked onto the two display objects 310c and 310d. By so doing, it is possible to display images that make it look as if the model 330b is eavesdropping on the conversation between the two display objects.

Figures 10A, 10B:
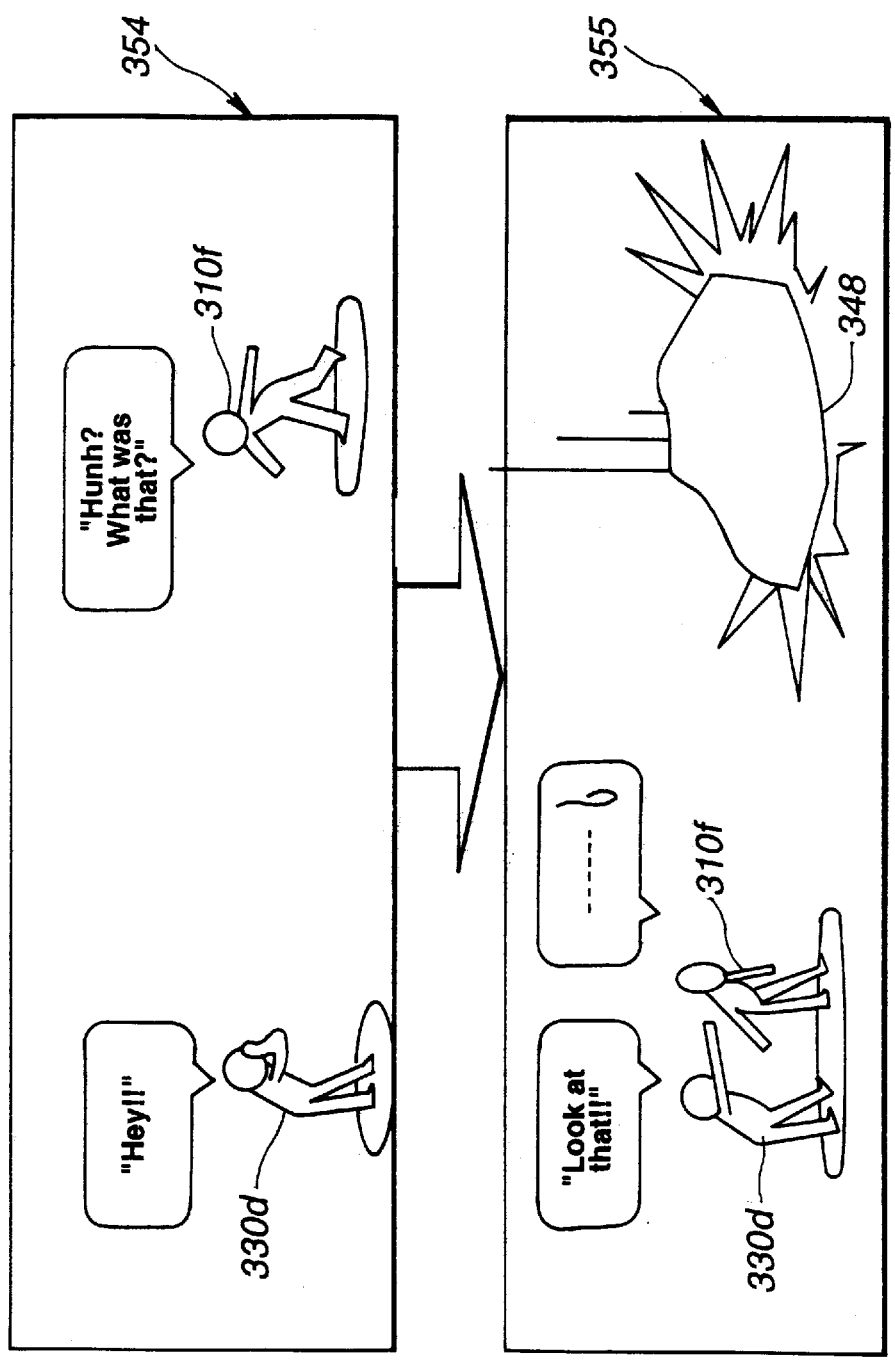
FIG. 10A–10B are diagrams depicting examples of screens that can be produced using the said image processing system.

In FIG. 9 is depicted an example of a similar communication. Let it be assumed that a model 330e is inside a facing building 342, and that a display object 310e is inside another building 344. Let it be assumed that a screen is displayed wherein the model 330e is looking out of a window 345 in the facing building 342 at the display object 310e in a window 346 in the other building 344. At this time, it is possible to make an image 353 wherein the display object 310e that can be seen in the window 346 in the other building 344 is locked onto, and the other display object 310e is shot from the facing building 342. In FIG. 10A is displayed a screen at one time, while in FIG. 10B is displayed a screen showing the situation after some specific time has elapsed since then. In FIG. 10A is displayed a screen 354 wherein a model 330d corresponding to a player is calling to a distant display object 310f. In this image example, the player locks onto the distant display object 310f. When this is done, it is possible to display images that represent the model 330d calling to the distant display object 310f, urging him or her to come over.

Then it is possible to display a screen 355, as depicted in FIG. 10B, wherein the display object 310f, after coming over to the model 330d, looks behind him or her to the place where he or she was until a moment before, seeing a large rock 348 come crashing down on that spot. As is shown by FIG. 7 through FIG. 10, one can take actions that are possible precisely because of a separation by some considerable distance and incorporate them into a situation development or puzzle solution in a game. Thus there is the advantage of being able to develop highly colorful games.

Other Transformation Examples

In the embodiment described in the foregoing, the position of a lock-on cursor was moved by manipulating a pad. It is also permissible, however, to fix the position of the lock-on cursor in some desired position on the screen, and to make it possible to take aim instead by moving coordinates to alter the field of view.

Figure 14:
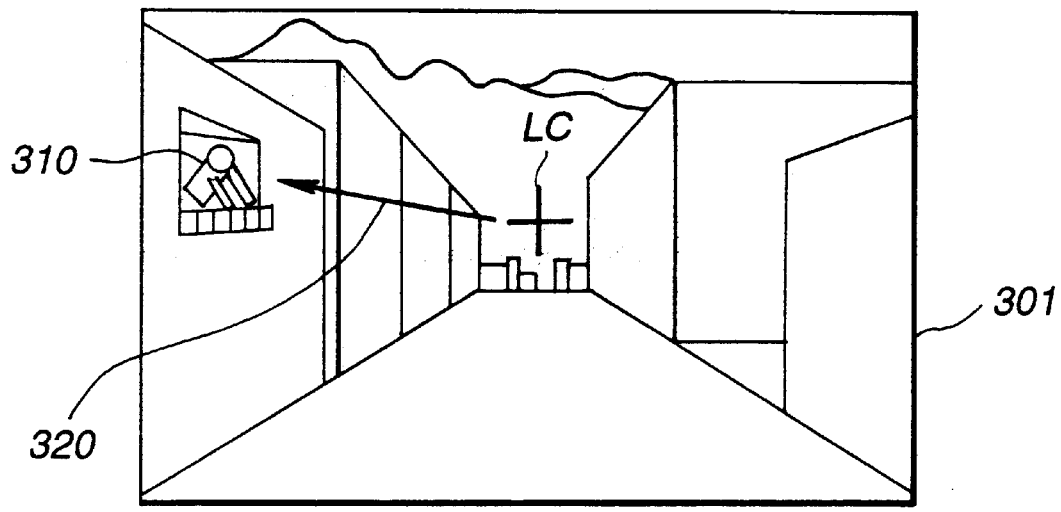
Figure 15:
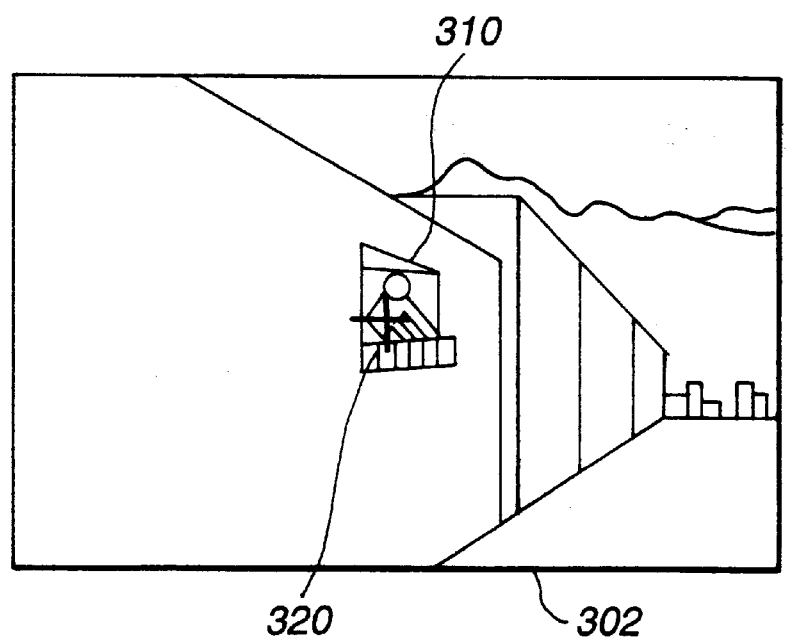

For example, as depicted in FIG. 14, one can display the lock-on cursor LC in the center of the screen, and establish screen 301, wherein the lock-on cursor cannot be moved from that position. In this situation, the line-of-sight direction is toward the horizon down the road, through the position of the lock-on cursor. In this condition, when a player manipulates a pad, the position of the visual point is changed, altering the field of view in response to that manipulation. If, for example, the position of the visual point moves to the right of the screen from the position of the visual point in FIG. 14, the lock-on cursor LC will move relatively in the direction of the arrow 320. As a result, the lock-on cursor can be moved to the position of the person 310, as depicted in FIG. 15. This manipulation resembles the aiming manipulations made in so-called flight simulators.

In such transformation examples as this, moreover, it is assumed that the position of the visual point coincides with the visual point of the model which a player is manipulating, so that the images seen by the model are displayed. It is also permissible to set it up so that, while the position of the visual point does not correspond with the position of the visual point of the model, it follows the movement of the model, maintaining a certain positional relationship with the model (such as, for example, staying behind the model).

In such a transformation example as this, furthermore, the position of the lock-on cursor is fixed on the screen, so it is not particularly necessary to display the cursor. In other words, it is sufficient for a player to make manipulations with the understanding that display objects in the center of the screen are always being aimed at. Also, even when the lock-on cursor LC is displayed, in addition to displaying it only when desiring to lock on, as in the embodiment described above, it is permissible to continuously display it. Also, insofar as the form of the game is concerned, in addition to interactive games such as roll playing games, adventure games or action games are also permissible, so long as there is communication through linguistic exchanges, etc., through movement or conversation between a plurality of models.

INDUSTRIAL APPLICABILITY

When the present invention is employed, it becomes possible to judge whether or not a segment positioned in virtual space is in a condition wherein it can be captured.

More specifically, when the present invention is employed, it is possible to judge additional conditions, even in cases where a segment is in a position wherein it can be captured. That being so, it becomes possible to set a multiplicity of conditions, according to the segment type or the circumstances surrounding it.

When the present invention is employed, moreover, in cases where the conditions making it possible to capture a segment have been satisfied, the next process can be selected. That being so, by selecting processes, it is possible to provide very colorful process content.

When the present invention is employed, furthermore, changes can be made in the image display of marks used in capturing. That being so, it is possible to eliminate monotony from capturing manipulations. When the present invention is employed, moreover, one can make capture possible, even if there is no superimposition between mark and segment, in virtual space defined in three dimensions.

When the present invention is employed, furthermore, in cases where it is possible to capture multiple segments in virtual space defined in three dimensions, a segment that is actually captured is made specific, referencing (a) distance (s), so that capture is possible even when a plurality of segments are positioned in proximity to each other. That being so, in cases where a plurality of segments exist overlapped, as seen from a prescribed visual point within virtual space, by making the configuration such that the segment that is closest relative to the visual point is determined as the target, and such that a decision is then made as to whether or not that target is capturable, inadvertent captures of segments hidden by obstructions can be prevented when there are obstructions in the vicinity of the segment to be captured.

What is claimed is:

1. An image processing device that image-displays segments positioned in virtual space, comprising:

display position determining means for determining a display position of a marker displayed on a display screen, wherein the marker is positioned on the display screen based on manipulation signals that correspond to manipulations of a player;

positional relationship determining means using data from the display position determining means to determine whether a condition that a marker determined by said display position determination means to be in a prescribed positional relationship relative to a targeted segment has been satisfied;

situation judging means for judging whether in addition thereto, said targeted segment is an object type which can converse with a character segment controlled by the player; and image displaying means for displaying said marker and for displaying an image indicating the fact that capture has been effected in cases where it has been judged by said situation judging means that said targeted segment is an object type which can converse with the character segment.

2. The image processing device according to claim 1, wherein, in said virtual space, segments that are manipulated based on said manipulation signals are displayed, and said image displaying means, in cases where it has been judged that said targeted segment satisfies conditions making capture possible, displays images that indicate the interrelationship between segments manipulated on the basis of said manipulation signals and said targeted segment.

3. The image processing device according to claim 1, wherein the conditions determined by said positional relationship determining means are that said marker and said targeted segment are overlapped on the display screen.

4. The image processing device according to claim 1, wherein the conditions making capture possible, as judged by said situation judging means, are whether or not said targeted segment is a processing object of said image displaying means.

5. The image processing device according to claim 1, further comprising an action selection means that, in cases where said targeted segment is capturable, displays a plurality of selection branches which indicate actions to be taken next, and wherein said image displaying means displays images based on a manipulation signal input corresponding to the selection branches displayed by said action selection means.

6. The image processing device according to claim 1, wherein said image displaying means changes the display form for said marker in accordance with the type of said targeted segment.

7. The image processing device according to claim 1, wherein said image displaying means changes the content of the image display according to the distance between said marker and said targeted segment.

8. The image processing device according to claim 1, wherein said positional relationship determining means computes distances between the visual point for image displaying and each segment that is overlapped in a decision range set in the vicinity of said marker, and determines the segment for which the computed distance is the shortest as a targeted segment that satisfies said conditions.

9. An image processing device that image-displays segments positioned in virtual space, comprising:

an input device that outputs manipulation signals that correspond to manipulations of a player;

a processing circuit that computes positions for one or more segments positioned in virtual space and a display position for a marker based on said manipulation signals, and that, based on the results of those computations, outputs image data containing segments to be displayed and an image of said marker; and an image display circuit that displays images based on image data output by said processing circuit; wherein said processing circuit determines the display position of the marker displayed on the display screen, wherein the marker is positioned on the display screen based on said manipulation signals, determines whether or not the conditions have been satisfied that a marker for which the display position has been determined is in the prescribed positional relationship relative to the targeted segment, judges also, in cases where said marker has been determined to be in the prescribed positional relationship relative to said targeted segment, whether or not the targeted segment is an object type which can converse with a character segment controlled by the player, and, in cases where it has been judged that said targeted segment is an object type which can converse with the character segment, outputs image data indicating that a capture has been made.

10. The image processing device according to claim 9, wherein said processing circuit outputs image data for a segment manipulated based on said manipulation signals, and, in cases where said targeted segment is judged to satisfy conditions making capture possible, outputs image data indicating interrelationship between the segment manipulated based on said manipulation signals and said targeted segment.

11. The image processing device according to claim 9, wherein the conditions for being in the prescribed positional relationship determined by said processing circuit are that said marker and said targeted segment are overlapped.

12. The image processing device according to claim 9, wherein the conditions making capture possible as judged by said processing circuit are whether or not said targeted segment is that defined beforehand as the processing object.

13. The image processing device according to claim 9, wherein said processing circuit, in cases where said targeted segment was capturable, outputs image data that display a plurality of selection branches indicating actions to be taken next, and also outputs image data based on the manipulation signals input in correspondence with said selection branches.

14. The image processing device according to claim 9, wherein said processing circuit outputs image data that display markers having different display forms, according to the type of said targeted segment.

15. The image processing device according to claim 9, wherein said processing circuit changes the content of the image data output, according to the distance between said marker and said targeted segment.

16. The image processing device according to claim 9, wherein said processing circuit computes distances between the visual point for image displaying and each segment that is overlapped in a decision range set in the vicinity of said marker, and determines the segment for which the computed distance is the shortest as a targeted segment that satisfies said conditions.

17. The game machine comprising an image processing device according to any one of claims 1 through 14.

18. The image processing device of claim 1, wherein said positional relationship determining means, using data from the display position determining means:

determines whether the marker overlaps a plurality of segments;

selects a segment, which is closest when viewed from a character segment viewpoint, from the plurality of segments as a first segment when it has been determined that the marker overlaps the plurality of segments;

determines whether a second segment obstructs the first segment when viewed from the character segment viewpoint;

selects the second segment as a targeted segment when it has been determined that the second segment obstructs the first segment; and selects the first segment as the targeted segment when it has been determined that the second segment does not obstruct the first segment.

19. The image processing device of claim 1, wherein said positional relationship determining means calculates the degree of superposition of the marker onto the first segment to determine whether the marker overlaps the first segment.

20. The image processing device of claim 1, wherein said image displaying means further comprises means for enlarging said targeted segment for communication when capture has been effected.

21. The image processing device of claim 1, wherein said image displaying means further comprises means for said targeted segment to move, after capture has been effected, in response to conversing by said character segment and said targeted segment.

22. The image processing device of claim 1, wherein the positional relationship determining means determines whether the marker overlaps a first segment, when it has been determined that the marker overlaps the first segment, determine whether a second segment obstructs the first segment when viewed from a character segment viewpoint, select the second segment as a targeted segment when it has been determined that the second segment obstructs the first segment, and select the first segment as the targeted segment when it has been determined that the second segment does not obstruct the first segment.

23. The image processing device of claim 9, wherein the processing circuit determines whether the marker overlaps a first segment, when it has been determined that the marker overlaps the first segment, determine whether a second segment obstructs the first segment when viewed from a character segment viewpoint, select the second segment as a targeted segment when it has been determined that the second segment obstructs the first segment, and select the first segment as the targeted segment when it has been determined that the second segment does not obstruct the first segment.

24. An image processing method for image-displaying segments positioned in virtual space, comprising:

a display position determining process for determining a display position of a marker displayed on a display screen, wherein the marker is positioned on the display screen based on manipulation signals that correspond to manipulations of a player;

a positional relationship determining process using data from the display position determining means to determine whether a condition that a marker determined by said display position determination means to be in a prescribed positional relationship relative to a targeted segment has been satisfied;

a situation judging process for judging whether in addition thereto, said targeted segment is an object type which can converse with a character segment controlled by the player; and an image displaying process for displaying said marker and for displaying an image indicating the fact that capture has been effected in cases where it has been judged by said situation judging means that said targeted segment is an object type which can converse with the character segment.

25. The image processing method of claim 24 wherein the positional relationship determining process determines whether the marker overlaps a first segment, when it has been determined that the marker overlaps the first segment, determine whether a second segment obstructs the first segment when viewed from a character segment viewpoint, select the second segment as a targeted segment when it has been determined that the second segment obstructs the first segment, and select the first segment as the targeted segment when it has been determined that the second segment does not obstruct the first segment.

26. A machine-readable recording medium to which program data are written for the purpose of executing:

a display position determining process for determining a display position of a marker displayed on a display screen, wherein the marker is positioned on the display screen based on manipulation signals that correspond to manipulations of a player;

a positional relationship determining process using data from the display position determining means to determine whether a condition that the marker determined by said display position determination means to be in a prescribed positional relationship relative to a targeted segment has been satisfied;

a situation judging process for judging whether in addition thereto, said targeted segment is an object type which can converse with a character segment controlled by the player; and an image displaying process for displaying said marker and for displaying an image indicating the fact that capture has been effected in cases where it has been judged by said situation judging means that said targeted segment is an object type which can converse with the character segment.

27. The machine-readable recording medium of claim 26, wherein the positional relationship determining process determines whether the marker overlaps a first segment, when it has been determined that the marker overlaps the first segment, determine whether a second segment obstructs the first segment when viewed from a character segment viewpoint, select the second segment as a targeted segment when it has been determined that the second segment obstructs the first segment, and select the first segment as the targeted segment when it has been determined that the second segment does not obstruct the first segment.

28. An image processing device that image-displays segments positioned in virtual space, comprising:

display position determining means for determining a display position of a marker displayed on a display screen, wherein the marker is positioned on the display screen based on manipulation signals that correspond to manipulations of a player;

positional relationship determining means using data from the display position determining means to determine whether a condition that a marker determined by said display position determination means to be in a prescribed positional relationship relative to a targeted segment has been satisfied; and situation judging means for judging whether in addition thereto, said targeted segment is an object type which can converse with a character segment controlled by the player.

29. The image processing device according to claim 28, further comprising image displaying means for displaying said marker and for displaying an image indicating the fact that capture has been effected in cases where it has been judged by said situation judging means that said targeted display item satisfies conditions making capture thereof possible.

30. The image processing device of claim 28, wherein the positional relationship determining means determines whether the marker overlaps a first segment, when it has been determined that the marker overlaps the first segment, determine whether a second segment obstructs the first segment when viewed from a character segment viewpoint, select the second segment as a targeted segment when it has been determined that the second segment obstructs the first segment, and select the first segment as the targeted segment when it has been determined that the second segment does not obstruct the first segment.

31. An image processing device configured such that an object being displayed in virtual space is capturable based on the manipulations of a player, comprising:

means for moving a capture cursor within a display screen in response to manipulations of the player;

means for deciding whether or not said object is within a range wherein communication is possible as viewed from a visual point of a character segment;

means for deciding, in cases where it has been decided that said object is within a range wherein communication is possible as viewed from said visual point, whether or not said object corresponds to an object type which can converse with a character segment controlled by the player; and means for changing the display of said cursor, in cases where it has been decided that said object corresponds to an object type which can converse with the character segment, so that the player can recognize that said object is capturable.

32. An image processing device configured such that an object being displayed within a display image and seen from a prescribed visual point in virtual space is capturable based on the manipulations of a player, comprising:

means for displaying a capture cursor within a display screen in response to manipulations of the player;

means for deciding whether said object is visible as viewed from said visual point;

means for deciding, in cases where it has been decided that said object is visible as viewed from said visual point, whether said object corresponds to an object type which can converse with a character segment controlled by the player; and means for changing the display of said cursor, in cases where it has been decided that said object corresponds to an object type which can converse with the character segment, so that the player can recognize that said object is capturable.

* * * * *